US009332781B2

(12) United States Patent
Simunovic et al.

(10) Patent No.: US 9,332,781 B2
(45) Date of Patent: May 10, 2016

(54) METHOD FOR PROCESSING BIOMATERIALS

(71) Applicant: ASEPTIA, INC., Raleigh, NC (US)

(72) Inventors: Josip Simunovic, Raleigh, NC (US); James Michael Drozd, Raleigh, NC (US)

(73) Assignees: Aseptia, Inc., Raleigh, NC (US); North Carolina State University, Raleigh, NC (US)

( * ) Notice: Subject to any disclaimer, the term of this patent is extended or adjusted under 35 U.S.C. 154(b) by 0 days.

(21) Appl. No.: 14/042,825

(22) Filed: Oct. 1, 2013

(65) Prior Publication Data

US 2014/0030398 A1    Jan. 30, 2014

Related U.S. Application Data

(60) Division of application No. 13/689,821, filed on Nov. 30, 2012, now Pat. No. 8,574,651, which is a continuation of application No. 12/565,580, filed on Sep. 23, 2009, now Pat. No. 8,337,920, application (Continued)

(51) Int. Cl.
| H05B 6/80 | (2006.01) |
| H05B 6/78 | (2006.01) |
| A23L 3/01 | (2006.01) |
| A23L 3/005 | (2006.01) |

(52) U.S. Cl.
CPC . *A23L 3/01* (2013.01); *A23L 3/005* (2013.01); *H05B 6/782* (2013.01); *H05B 6/802* (2013.01); *Y10T 137/0391* (2015.04); *Y10T 137/6606* (2015.04)

(58) Field of Classification Search
CPC ............. H05B 6/802; H05B 6/70; H05B 6/78
USPC ......... 219/687, 695, 750, 640, 688, 689, 696, 219/697, 745, 746, 748, 749, 686; 315/111.21, 112, 39; 422/186, 21; 426/241, 243, 521, 523
See application file for complete search history.

(56) References Cited

U.S. PATENT DOCUMENTS 2,833,657 A * 5/1958 Copson ........................ 426/241
3,535,482 A    10/1970 Kluck
(Continued)

FOREIGN PATENT DOCUMENTS

| EP | 0765105 A2 | 3/1997 |
| EP | 1570753 A1 | 9/2005 |

(Continued)

OTHER PUBLICATIONS

European Supplementary Search Report issued Mar. 19, 2012.
(Continued)

Primary Examiner — Quang Van
(74) Attorney, Agent, or Firm — Merchant & Gould P.C.

(57) ABSTRACT

Systems and method for thermal preservation (sterilization) of heterogenous and multiphase foods and biomaterials in order to achieve their shelf stability at ambient level temperatures. Flowing heterogenous, multiphase foods and biomaterials are exposed to single or multiple stages of electromagnetic energy under continuous flow conditions within conduits passing through the electromagnetic energy exposure chambers.

15 Claims, 16 Drawing Sheets

Related U.S. Application Data

No. 14/042,825, which is a continuation of application No. 13/120,615, filed as application No. PCT/US2009/057603 on Sep. 20, 2009.

(60) Provisional application No. 61/099,434, filed on Sep. 23, 2008, provisional application No. 61/099,434, filed on Sep. 23, 2008.

(56) References Cited

U.S. PATENT DOCUMENTS

| | | | |
|---|---|---|---|
| 3,577,322 A | 5/1971 | Nesbitt et al. |
| 3,706,631 A | 12/1972 | Falk |
| 3,710,063 A | 1/1973 | Aine |
| 3,843,860 A | 10/1974 | Jory et al. |
| 4,208,806 A | 6/1980 | Manser et al. |
| 4,237,145 A | 12/1980 | Risman et al. |
| 4,284,869 A | 8/1981 | Pinkstaff |
| 4,417,132 A | 11/1983 | Simpson |
| 4,534,282 A | 8/1985 | Marinoza |
| 4,640,840 A | 2/1987 | Assinder et al. |
| 4,671,951 A | 6/1987 | Masse |
| 4,808,783 A | 2/1989 | Stenstrom |
| 4,975,246 A | 12/1990 | Charm |
| 5,021,981 A | 6/1991 | Swartzel et al. |
| 5,080,164 A | 1/1992 | Hermans |
| 5,159,564 A | 10/1992 | Swartzel et al. |
| 5,290,583 A | 3/1994 | Reznik et al. |
| 5,309,987 A | 5/1994 | Carlson |
| 5,389,335 A | 2/1995 | Charm et al. |
| 5,403,564 A | 4/1995 | Katschnig et al. |
| 5,417,991 A | 5/1995 | Green |
| 5,514,389 A | 5/1996 | Nikdel et al. |
| 5,636,317 A | 6/1997 | Reznik |
| 5,662,031 A | 9/1997 | Qin et al. |
| 5,667,828 A | 9/1997 | Nikdel et al. |
| 5,697,291 A | 12/1997 | Burgener et al. |
| 5,722,312 A | 3/1998 | Kristensen |
| 5,739,437 A | 4/1998 | Sizer et al. |
| 5,750,907 A | 5/1998 | Botos et al. |
| 5,776,529 A | 7/1998 | Qin et al. |
| 5,876,771 A | 3/1999 | Sizer et al. |
| 5,932,813 A | 8/1999 | Swartzel et al. |
| 5,972,405 A | 10/1999 | Sizer |
| 5,976,592 A | 11/1999 | Polato |
| 5,998,774 A | 12/1999 | Joines et al. |
| 6,010,727 A | 1/2000 | Rosenthal |
| 6,015,231 A | 1/2000 | Swartzel et al. |
| 6,019,031 A | 2/2000 | Qin et al. |
| 6,136,015 A | 10/2000 | Kurz et al. |
| 6,178,880 B1 | 1/2001 | Mastwijk et al. |
| 6,246,037 B1 | 6/2001 | Drozd et al. |
| 6,433,320 B2 | 8/2002 | Bartoletti et al. |
| 6,536,947 B1 | 3/2003 | Swartzel et al. |
| 6,766,699 B2 | 7/2004 | Swartzel et al. |
| 6,776,523 B2 | 8/2004 | Simunovic et al. |
| 6,917,022 B2 | 7/2005 | Feher et al. |
| 6,953,315 B2 | 10/2005 | Cartwright |
| 7,004,620 B2 | 2/2006 | Simunovic et al. |
| 7,112,954 B2 | 9/2006 | Palazoglu et al. |
| 7,144,213 B2 | 12/2006 | Cartwright |
| 7,213,967 B2 | 5/2007 | Simunovic et al. |
| 7,270,842 B1 | 9/2007 | Lanier et al. |
| 8,378,275 B2 | 2/2013 | Novak |
| 2002/0000437 A1 | 1/2002 | Bartoletti et al. |
| 2002/0011487 A1 | 1/2002 | Matsuo et al. |
| 2003/0209542 A1 | 11/2003 | Harris |
| 2004/0155034 A1 | 8/2004 | Feher et al. |
| 2005/0139594 A1* | 6/2005 | Jones et al. ............. 219/687 |
| 2006/0013927 A1 | 1/2006 | Geveke et al. |
| 2006/0093717 A1 | 5/2006 | Akkerman et al. |
| 2006/0151533 A1 | 7/2006 | Simunovic et al. |
| 2007/0018639 A1 | 1/2007 | Palazoglu et al. |
| 2007/0211784 A1 | 9/2007 | Simunovic et al. |
| 2011/0036246 A1 | 2/2011 | Simunovic et al. |
| 2011/0174385 A1 | 7/2011 | Drozd |

FOREIGN PATENT DOCUMENTS

| | | |
|---|---|---|
| GB | 2098040 A | 11/1982 |
| JP | A 04-290410 | 10/1992 |
| JP | A 07-123918 | 5/1995 |
| JP | A 2007-135595 | 6/2011 |
| KR | 1993-0010449 | 6/1993 |
| WO | WO 2010/039466 | 4/2010 |
| WO | WO 2010/039523 | 4/2010 |

OTHER PUBLICATIONS

International Preliminary Report on Patentability, issued Mar. 29, 2011 for PCT/US2009/057603.

International Search Report and Written Opinion issued May 10, 2010 for PCT/US2009/057603.

International Preliminary Report on Patentability, issued Mar. 29, 2011 for PCT/US2009/057989.

International Search Report and Written Opinion issued May 4, 2010 for PCT/US2009/057989.

A Supplementary European Search Report dated Mar. 5, 2012.

* cited by examiner

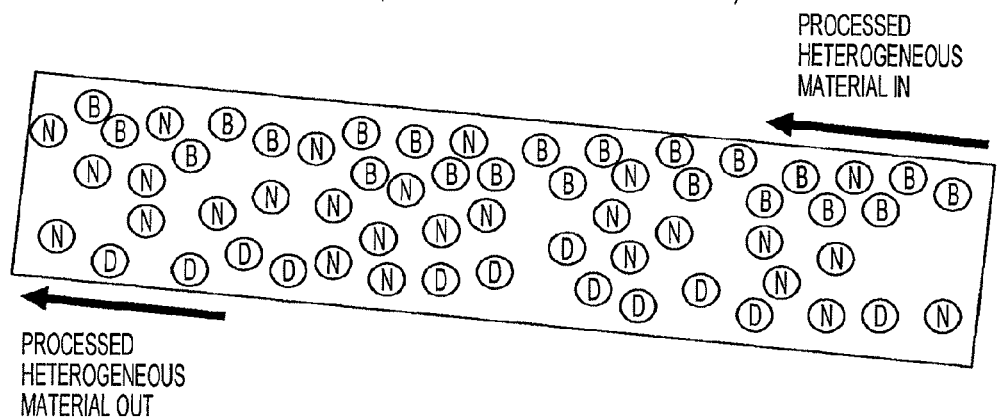
TRANSPARENT CONDUIT DETAIL WITH PREFERENTIALLY HEATED BOTTOM SEGMENT OF THE CONDUIT AND INDIVIDUAL PARTICULATE COMPONENTS WITH DIFFERENT DENSITY RANGES (STAGE 1).
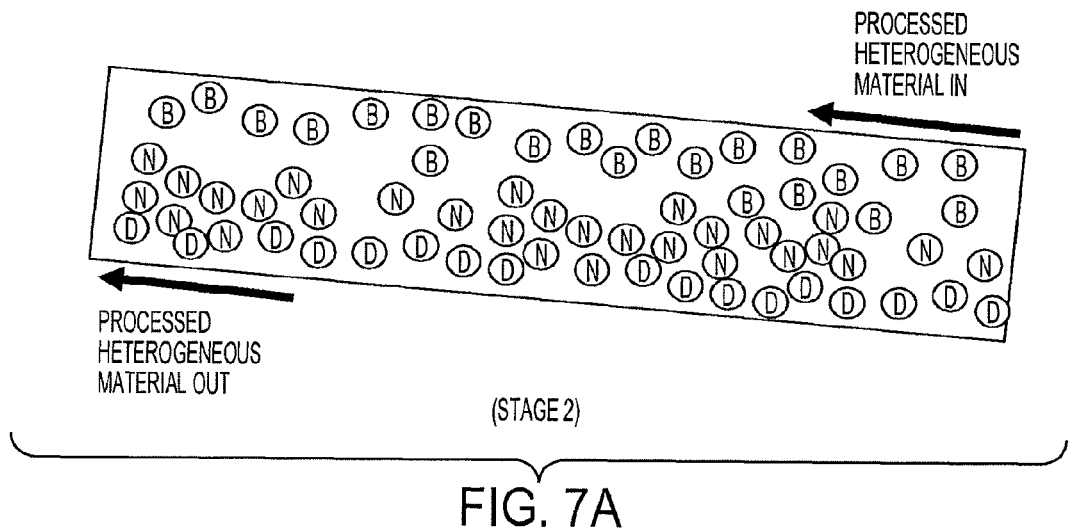
(STAGE 2)
FIG. 7A

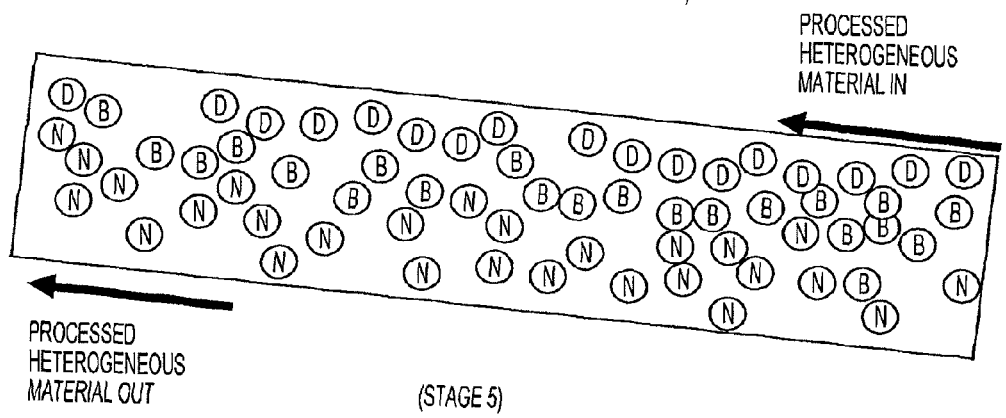
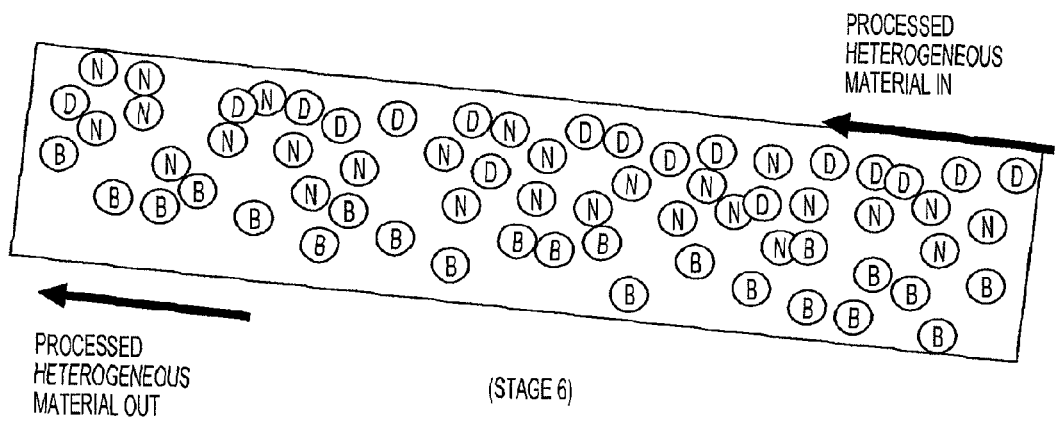
FIG. 7C

Ⓝ INITIALLY NEUTRALLY BUOYANT PARTICLES (DENSITY CLOSE TO CARRIER FLUID)
Ⓑ INITIALLY BUOYANT PARTICLES (DENSITY LOWER THAN CARRIER FLUID)
Ⓓ INITIALLY DENSE PARTICLES (DENSITY HIGHER THAN CARRIER FLUID)
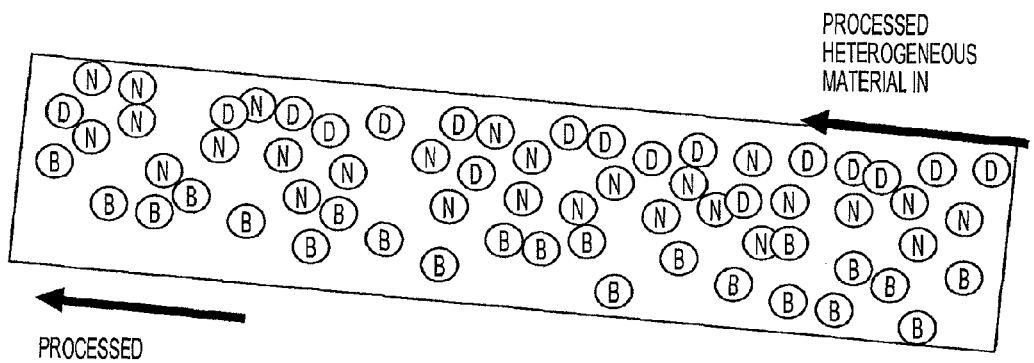
(STAGE 7)
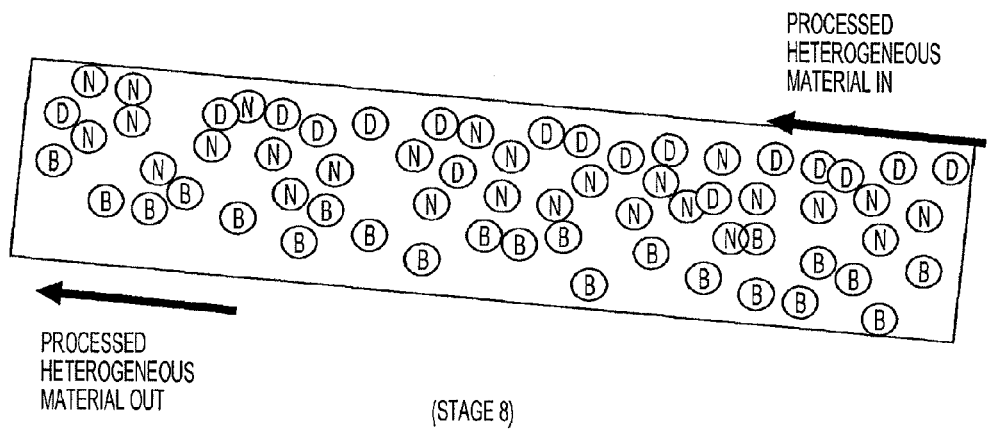
(STAGE 8)
FIG. 7D

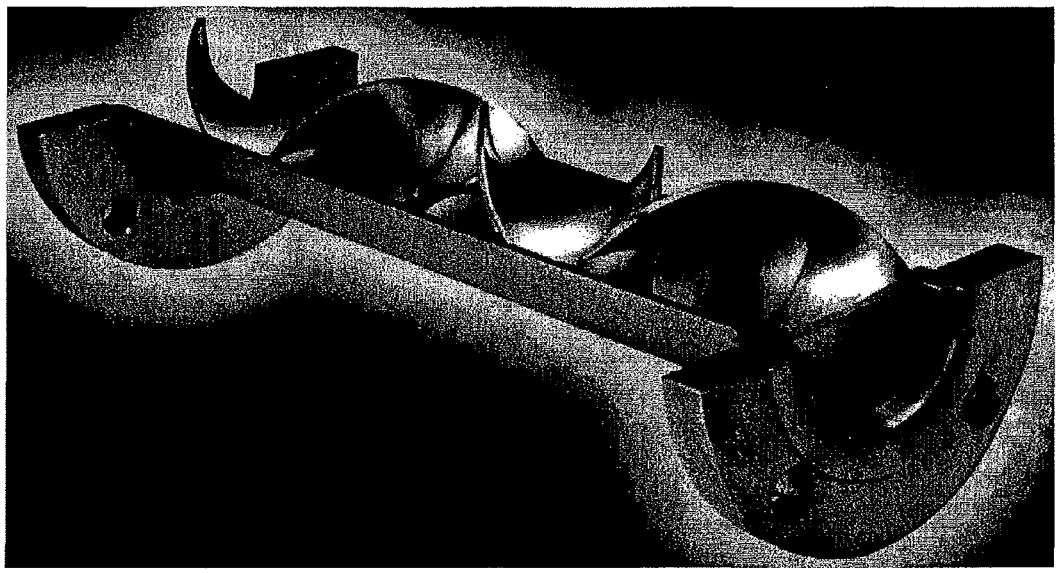
Figure 9 GC-2. Cutaway view of conventional static mixer design.
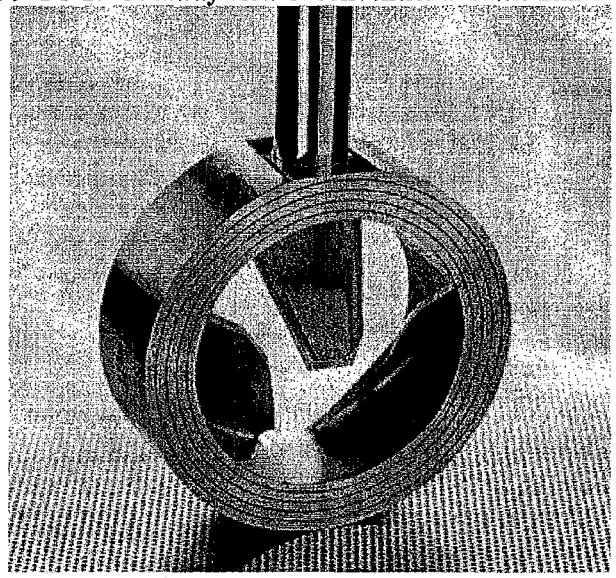
Figure 10 GC-3 Non-conventional static mixer.

METHOD FOR PROCESSING BIOMATERIALS

CROSS REFERENCE TO RELATED APPLICATIONS

This is a Division of application Ser. No. 13/689,821 filed Nov. 30, 2012, which claims benefit of priority to U.S. patent application Ser. No. 12/565,580, as filed on Sep. 23, 2009, which claims the benefit of priority under 35 U.S.C. §119(e) to the filing date of U.S. Provisional Application No. 61/099,434, as filed on Sep. 23, 2008 ("the '434 provisional application"), both of which are incorporated herein by reference in their entireties.

Application Ser. No. 13/689,821 filed Nov. 30, 2012 also claims the benefit of priority to co-pending U.S. patent application Ser. No. 13/120,615, as filed on Mar. 23, 2011, which is an application filed under 35 U.S.C. §371 for PCT Application No. PCT/US2009/057603, which was filed on Sep. 20, 2009 and claims priority to the '434 provisional application, each of which are incorporated herein by reference in their entireties.

BACKGROUND

There is need for thermal preservation (sterilization) of heterogeneous and multiphase foods and biomaterials in order to achieve long shelf stability at ambient level temperatures. Methods are needed to effectively heat flowing heterogeneous and multiphase foods and biomaterials.

SUMMARY

In one embodiment, a method includes providing an electromagnetic system. The electromagnetic system may comprise a first applicator comprising a entry end to receive electromagnetic energy, a termination end, a waveguide, a material entry port, and a material exit port; and a second applicator comprising a beginning portion, an end portion, a waveguide, a material entry port, and a material exit port. A first termination member may be attached to the termination end of the first applicator so that no electromagnetic energy transfers from the first applicator to the second applicator. Also, a second termination member may be attached to the end portion of the second applicator so that electromagnetic energy does not proceed past the second termination member. At least one electromagnetic generator may be configured to provide electromagnetic energy to the first and second applicators. The method may further include continuously pumping heterogeneous materials through the first and second applicators so that the heterogeneous materials traveling through and exiting the first applicator is then delivered through the second applicator and so that the heterogeneous materials absorb electromagnetic energy from the first applicator and absorb electromagnetic energy from the second applicator. The method also may include delivering electromagnetic energy from at least one electromagnetic generator to the first and second applicators while the heterogeneous materials are being pumped.

In another embodiment, a system includes a conduit configured to carry heterogeneous materials that is pumped therethrough; a first applicator comprising an end portion, a waveguide, a material entry port, and a material exit port; a second applicator comprising a beginning portion, a waveguide, a material entry port, and a material exit port; and an electromagnetic generator connected to the first and second applicators so as to provide electromagnetic energy to both the first and second applicators. The beginning portion of the second applicator is attached to the end portion of the first applicator so that electromagnetic energy exiting the first applicator end portion is received by the beginning portion of the second applicator.

In another embodiment, a system includes a first applicator comprising an end portion, a waveguide, a material entry port, and a material exit port; an electromagnetic generator connected to the first applicator so as to provide electromagnetic energy to the first applicator; and a conduit comprising an interior and configured to carry heterogeneous materials comprising liquid and solid materials. The conduit is attached to the first applicator so that the heterogeneous materials pass through the material entry port and the material exit port. The conduit interior comprises a top portion, a bottom portion and a center portion. The conduit is aligned along the longitudinal length of the first applicator so that a higher concentration of the electromagnetic energy is applied to the bottom portion relative to the center and top portions of the conduit's interior thereby causing materials in the bottom portion of the conduit's interior to heat faster than materials in the center and top portions of the conduit's interior.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 7A illustrates a solid particle flow distribution at various stages according to some embodiments of the present invention.

FIG. 7C illustrates a solid particle flow distribution at various stages after FIG. 7B according to some embodiments of the present invention.

FIG. 7D illustrates a solid particle flow distribution at various stages after FIG. 7C according to some embodiments of the present invention.

FIG. 9 illustrates a cutaway view of static mixer design that may be implemented into the thermal processing system according to some embodiments of the present invention.

FIG. 10 illustrates a cutaway view of another static mixer design that may be implemented into the thermal processing system according to other embodiments of the present invention.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
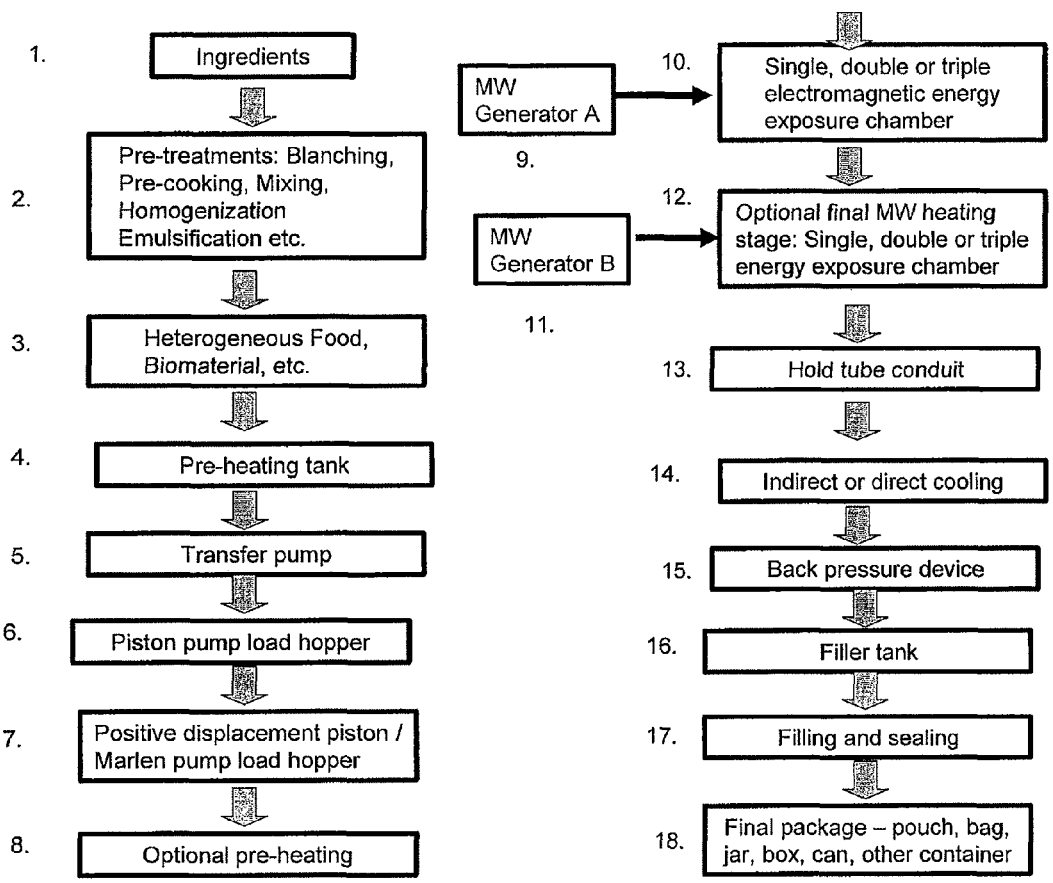
FIG. 1 illustrates a block diagram of a method for processing of heterogeneous materials according to one embodiment of the present invention.

FIG. 1 illustrates a sequence of operations for thermal preservation of heterogeneous and multiphase foods using single or multi-stage exposure to electromagnetic energy under continuous flow conditions. The process may begin with ingredients and pre-treatments of the ingredients in making food materials and other biomaterials. The biomaterials may be heterogeneous materials, or materials which include materials of varying densities. As illustrated a tank is preheated. The materials are loaded to a microwave system in order to heat or treat the materials loaded therein. Such heating may occur in several stages. These heating stages are illustrated and elaborated below regarding FIGS. 2 through 6.

Figure 2:
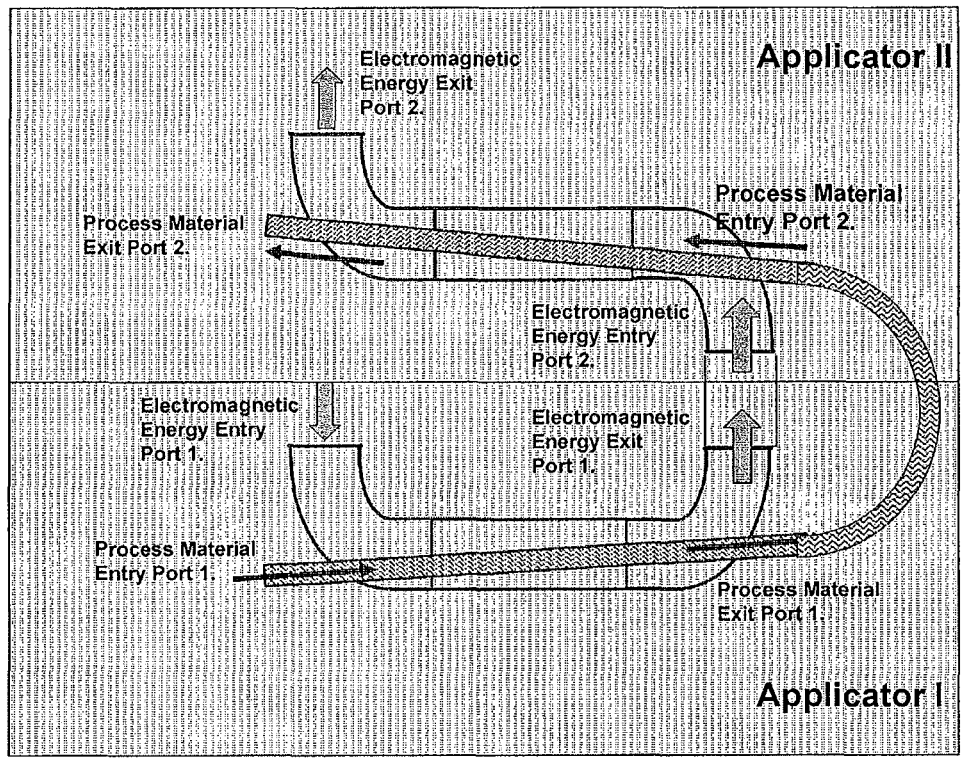
FIG. 2 illustrates a system for processing of heterogeneous materials according to one embodiment of the present invention.

FIG. 2 is a schematic outline of one of the embodiments of a heating stage of the process for thermal preservation of flowable heterogenous materials (foods or biomaterials) by exposure of the process material to electromagnetic energy under continuous flow conditions. Process materials enter the first applicator through process material entry port 1 with an average temperature of T1AVG, maximum temperature T1MAX, and a minimum temperature of T1MIN. Concurrently, electromagnetic energy is introduced into Applicator 1 through electromagnetic energy entry port 1. Process material flows through a substantially horizontal conduit made of material or combination of materials transparent to electromagnetic energy. The horizontal flow is relative to ground or earth.

Typical materials for fabrication of these conduits are ceramics (typically Alumina ceramic), glass (typically Borosilicate glass) and/or a variety of plastic polymers (Teflon, polypropylene, polysulfone, polyetheretherketone (PEEK), and polyetherimide (Ultem)

During the flow through the transparent conduit within the first applicator the first increment of temperature increase of the process material is realized. By the time process material exits the first applicator its average temperature has increased to T2AVG, its minimum temperature to T2MIN and its maximum temperature to T2MAX. Concurrently, part of the electromagnetic energy which has entered Applicator 1 is absorbed by the process material and converted to heat. Energy field density of electromagnetic energy exiting the first applicator (at electromagnetic energy exit port 1) and entering the second applicator has been reduced by the amount of energy absorbed by the process material. Following exit from Applicator 1, process material is conveyed through a segment of conduit placed outside of the of electromagnetic field exposure. This segment can be modified in conduit profile, diameter, geometry or equipped with static or active in-line mixing devices to improve the rate and extent of temperature equalization. Optionally, this segment can also be insulated or heated conventionally (tube in tube heat exchanger). Following temperature equalization outside of electromagnetic energy exposure region, process material enters the second applicator with and average temperature of T3AVG, maximum temperature of T3MAX and minimum temperature of T3MIN, wherein the difference (T3MAX-T3MIN) is substantially lower than the difference (T2MAX-T2MIN). Concurrently, electromagnetic energy exiting from applicator 1 via electromagnetic energy exit port 1 is conveyed via a connecting waveguide into applicator 2 via electromagnetic energy entry port 2. Energy density/intensity level entering applicator 2 is lower than energy level originally delivered from the generator into Applicator 1 through energy entry port 1.

Process material is further heated during conveyance through the second applicator—following material entry through material entry port 2. Electromagnetic energy continues to be absorbed while the process material is exposed to its field while traveling through the second conduit constructed from a single or combination of multiple electromagnetic-energy transparent materials.

Optionally, transparent conduit placed within the second applicator can have a different material structure and composition, design, cross-sectional profile or diameter. Exiting from the second applicator, process material temperatures are characterized by T4AVG, T4MIN and T4MAX temperature values wherein temperature differences T4AVG-T3AVG, T4MAX-T3MAX and T4MIN-T3MIN are preferably lower than respective temperature differences T2AVG-T1AVG, T2MAX-T1MAX and T2MIN-T1MIN.

Electromagnetic energy exits the second applicator with further reduced energy density level and is optionally conveyed into the next entry port of another applicator or terminated with a water load. The second applicator may be terminated by a termination member, which may be a water load, a conductive plate that may set up a standing wave in the second applicator, or some other termination means to not allow electromagnetic energy that has not been absorbed by the heterogeneous materials to exit the second applicator.

Figure 14:
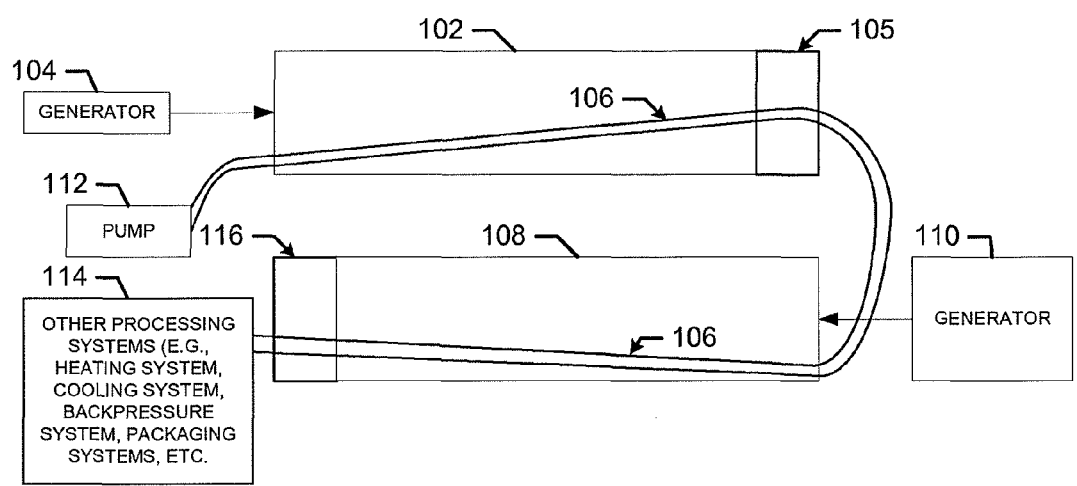
FIG. 14 a system for processing of heterogeneous materials using termination members according to an embodiment of the present invention

In one embodiment (as illustrated in FIG. 14), a material processing system is shown. A generator 104 provides electromagnetic energy (e.g., microwave energy) to a first applicator 102. Another generator 110 may provide electromagnetic energy (e.g., microwave energy) to a second applicator 108 in one embodiment. A pump 112 may pump the heterogeneous materials through conduit 106, which enters the first applicator 102 at a first end and exits the first applicator 102 at a second end (while being exposed to the electromagnetic energy provided by generator 104). The heterogeneous materials then travel through conduit 106 to enter the second applicator 108 at a first end and exit the second applicator 108 at a second end (while being exposed to the electromagnetic energy provided by generator 110).

The first applicator 102 may be terminated with a first termination member 105, which may be a water load, a conductive plate that may set up a standing wave in the first applicator 102, or some other termination means to not allow electromagnetic energy that has not been absorbed by the heterogeneous materials to exit the first applicator 102 and enter a second applicator 108. In addition, the second applicator 108 may also be terminated with a termination member (i.e., a second termination member 116), which may be a water load, a conductive plate that may set up a standing wave in the second applicator, or some other termination means to not allow electromagnetic energy that has not been absorbed by the heterogeneous materials in the second applicator to exit the second applicator. Thus, in one embodiment, both the first and second applicators 102, 108 may have termination members 105, 116. For example, the first applicator 102 may be terminated with a first water load that absorbs the electromagnetic energy not absorbed by the heterogeneous materials that travels through the first applicator 102, and the second applicator 108 may be terminated with a second water load that absorbs the electromagnetic energy not absorbed by the heterogeneous materials that travels through the second applicator 108. In another example, the first applicator 102 may be terminated with a conductive plate covering the second end of the first applicator 102 to create a standing wave in the first applicator 102, and the second applicator 108 may be terminated with a conductive plate covering the end of the second applicator 108 to create a standing wave in the second applicator 108.

The termination members 105, 116 may be different from each other. For example, the first applicator 102 may be terminated with a water load while the second applicator 108 may be terminated with a conductive plate. Regardless, in the embodiments where the first and second applicators 102, 108 each have termination members 105, 116, and while electromagnetic energy is not allowed to travel from the first applicator 102 to the second applicator 108 in these embodiments, the same heterogeneous materials that is pumped from the first applicator 102 (via pump 112) is then still pumped through the second applicator 108. In this regard, electromagnetic energy is supplied to both the first and second applicators 102, 108 either separately by separate generators (as illustrated) or by a single generator with a waveguide split (not illustrated). The electromagnetic energy that enters the first applicator 102 through conduit 106 is at least partially absorbed by the heterogeneous materials, and, similarly, when the heterogeneous materials enter the second applicator 108, electromagnetic energy supplied to the second applicator 108 is then at least partially absorbed. This allows the heterogeneous materials to make two passes through two independent electromagnetic energy chambers (e.g., 102 and 108), according to an embodiment. Because the electromagnetic energy is independent in such embodiment, this may reduce hot spots causes by the electromagnetic energy sources combining in one of the applicators. It should be understood that the above-discussed embodiments are only exemplary methods of processing the heterogeneous materials and other configurations and methods are also possible as discussed and illustrated herein.

It should be noted that the heterogeneous materials that exit the second applicator 108 then continues to other processing systems 114, such as constant heating systems, cooling systems, backpressure systems, packaging systems, or any other system for processing or handling of the heterogeneous materials.

Temperature levels and temperature ranges in all segments within the process material exiting the final applicator stage are sufficiently high to achieve a pre-determined level of thermal preservation (pasteurization requiring subsequent refrigeration or sterilization resulting in long-term shelf stability at ambient temperatures of storage and distribution) in the least thermally treated segment of the material after being subjected to a sufficient hold treatment.

The hold treatment is typically implemented by flowing the process material through a segment of non-heating cylindrical profile conduit segment long enough to achieve the pre-determined level of product preservation. Optionally, additional treatments and devices can be implemented between the process material exit from the final applicator exit port and entry into the hold segment—such as static or active agitating devices in order to accelerate the equalization of temperatures in the process material stream.

Figure 3:
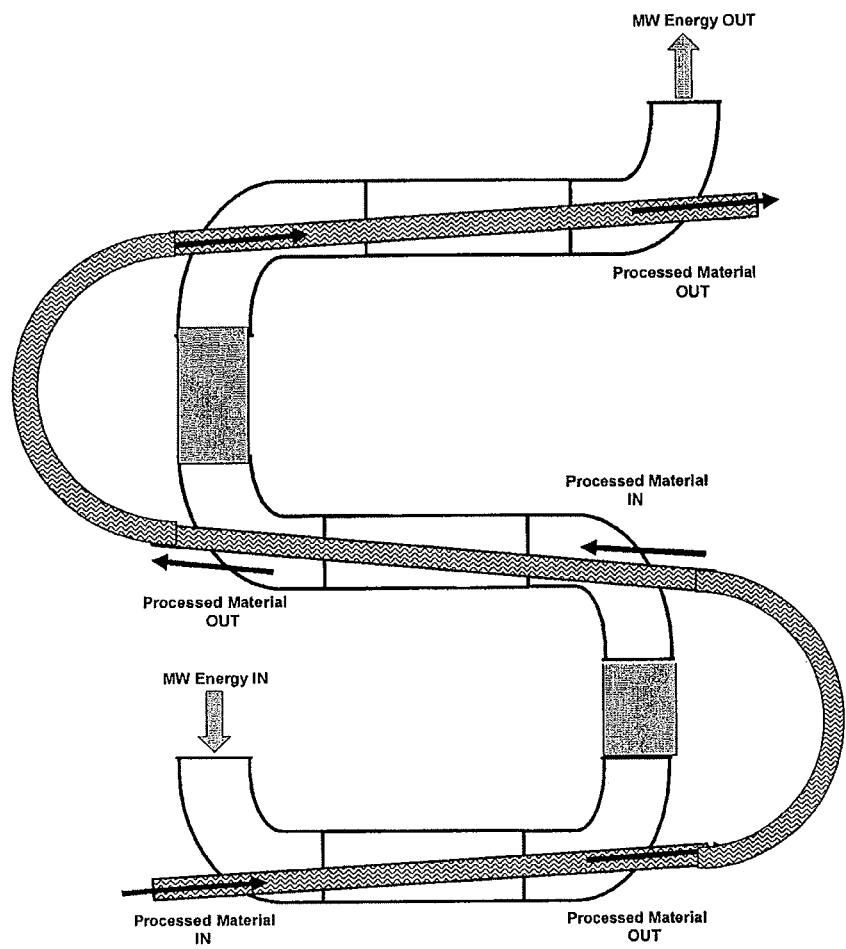
FIG. 3 illustrates a system for processing of heterogeneous materials according to another embodiment of the present invention.

FIG. 3 illustrates the 3-stage of heating for thermal preservation and/or sterilization of heterogeneous (particle containing) foods by heating under continuous flow exposure to electromagnetic energy.

Figure 4:
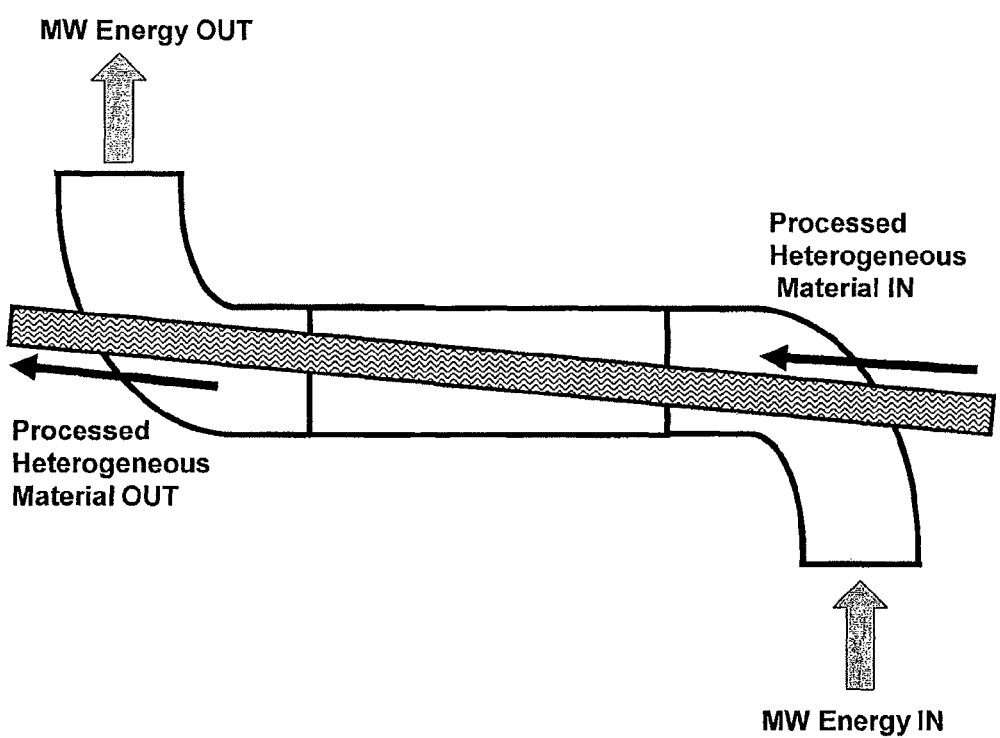
FIG. 4 illustrates a system for processing of heterogeneous materials according to another embodiment of the present invention.

FIG. 4 illustrates the concept of heating for thermal preservation and/or sterilization of heterogeneous (particle containing) foods by heating under continuous flow exposure to electromagnetic energy.

Process material (particle-containing food or biomaterial) is introduced into the electromagnetic energy exposure chamber via material entry port 1 and conveyed under continuous flow conditions through a microwave-transparent conduit C, fabricated from a single or combination of materials from a group of ceramics, glass and polymer materials with high temperature-resistant, high pressure-resistant characteristics.

During the passage through the microwave-transparent conduit C, heterogeneous/particulate material is exposed to electromagnetic energy which is absorbed by product constituents to varying levels. Electromagnetic energy is introduced through port A, propagates through a metal-walled series of waveguides and single or multiple exposure chambers to terminate in a water load. The electromagnetic exposure chamber in FIG. 4 can be considered to represent a single or multiple chambers required to achieve the desired temperature levels throughout the heterogeneous process material components.

Electromagnetic energy absorption and subsequent conversion to heat result in the increase of temperature of process material. The electromagnetic energy exposure chamber D, or a series of similar exposure chambers are designed to allow for sufficient time and level of exposure of process material to enable the lowest heated element in the material to achieve the condition of commercial sterility (shelf stability under ambient storage conditions) in the processed heterogeneous (particle-containing) food or biomaterial. Exposure within the single or multiple chambers is used to achieve predetermined temperature levels in the process material, sufficient to impart commercial sterility to process material. These temperatures can range from approximately 70 C to approximately 105 C for high acid foods and biomaterials (e.g. fruits and products such as pickled vegetables, tomato dices and acidified salsa), and from approximately 110 C to approximately 145 C for low acid foods and biomaterials (chunky soups, stews, cheese sauces with particles etc). Upon exit from the final electromagnetic exposure chamber, process material will be passed through a tube segment sufficiently long to enable maintenance of the process material at or above the predetermined temperature level for a predetermined amount of time under continuous flow conditions. This tube segment is referred to herein as a hold tube. Typically, the lower the temperature at the exit of the hold tube, the longer the hold tube will need to be, since the sterilization treatment to achieve commercial sterility is a thermal process implementing a predetermined temperature level treatment for a predetermined minimum amount of time. This combination of time and temperature treatment is required to thermally inactivate microorganisms which could potentially endanger health of consumers and/or spoilage of the product under typical conditions of storage and distribution.

FIG. 5 is an illustration of microwave transparent tube with heterogeneous product, i.e. carrier fluid and individual particulate components with different density ranges continuously flowing through a substantially horizontal tube under the regime of uniform heating of the carrier fluid.

Any heterogeneous biomaterial, and especially foods containing particles (e.g., fluid with chucks), will contain solid pieces with a range of density values. This is true even when there is a single solid component within the product (e.g. tomato dices in tomato juice or blueberries in blueberry juice) and more so with multiple solid components present (e.g. fruit salad in syrup or minestrone soup). At lower flow rates (laminar flow conditions) particles that are at least 0.5% denser than the carrier fluid will tend to flow along the bottom segment of the tube (D), particles that are nearly identical in density to the carrier fluid are called neutral or neutrally buoyant (N) and tend to flow at locations throughout the tube cross section—bottom, top and center. Particles which have density at least 0.5% lower than the carrier fluid will tend to flow along the top of the tube and are marked as buoyant (B). As flow rates increase, flow conditions become more turbulent and locations of flow for greater range of particle densities become more distributed—i.e. denser particles tend to be lifted off the bottom and carried in the fluid stream and buoyant particles will also get mixed into other locations along the flow lines. Horizontal upward flow regime therefore tends to equalize residence time solid particles (single or multiple types) spend within a specific tube segment. Under other flow regimes (vertical upward or vertical downward) it would be impossible to maintain this equalization over a range of densities.

Figure 5A:
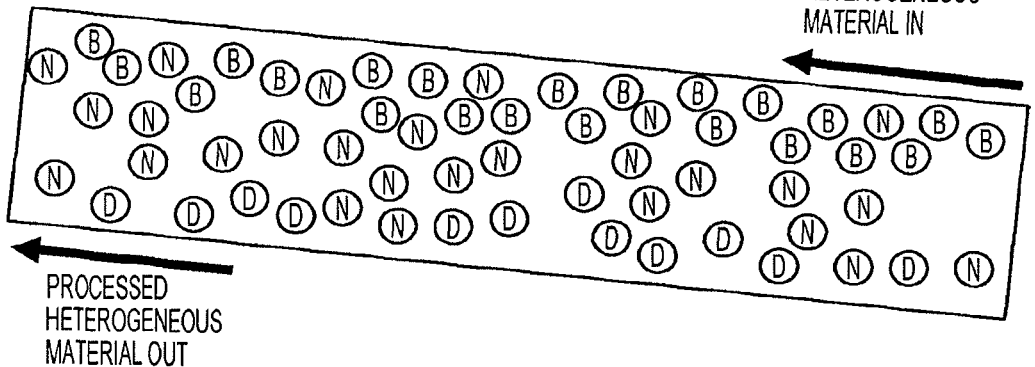
FIG. 5A illustrates a solid particle flow distribution at one stage according to one embodiment of the present invention.
Figure 5B:
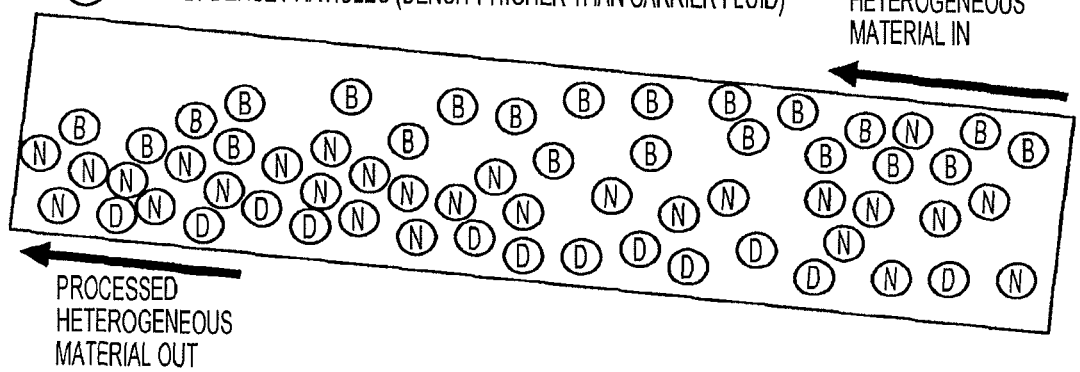
FIG. 5B illustrates a solid particle flow distribution at another stage according to some embodiments of the present invention.

FIG. 5B is a depiction of a process while heating a product containing dense, neutral and buoyant particle phases where the carrier fluid is being heated under continuous flow condition. A typical instance of this type of heating would be tube in tube heat exchangers or volumetric heating wherein the carrier fluid has properties that allow it to be heated preferentially (dielectric properties and thermo-physical properties such as low heat capacity and high heat diffusivity). As the product flows from entry port, through the tube and out of the exit port (from right to left in FIG. 5A), temperature of carrier fluid increases which is accompanied by a decrease in its density. Since the solid particles carried within the fluid do not heat as rapidly, neither their temperature nor their density changes significantly for some time. The gradual reduction of density of the carrier fluid caused by heating without the concurrent reduction of density of particles can lead to the situation shown in the left-hand side of FIG. 5B, i.e. all contained solid components (initially dense, neutral and buoyant) can end up flowing along the bottom of the tube due to having higher densities than the carrier fluid in some segments of process during heating.

Figure 6:
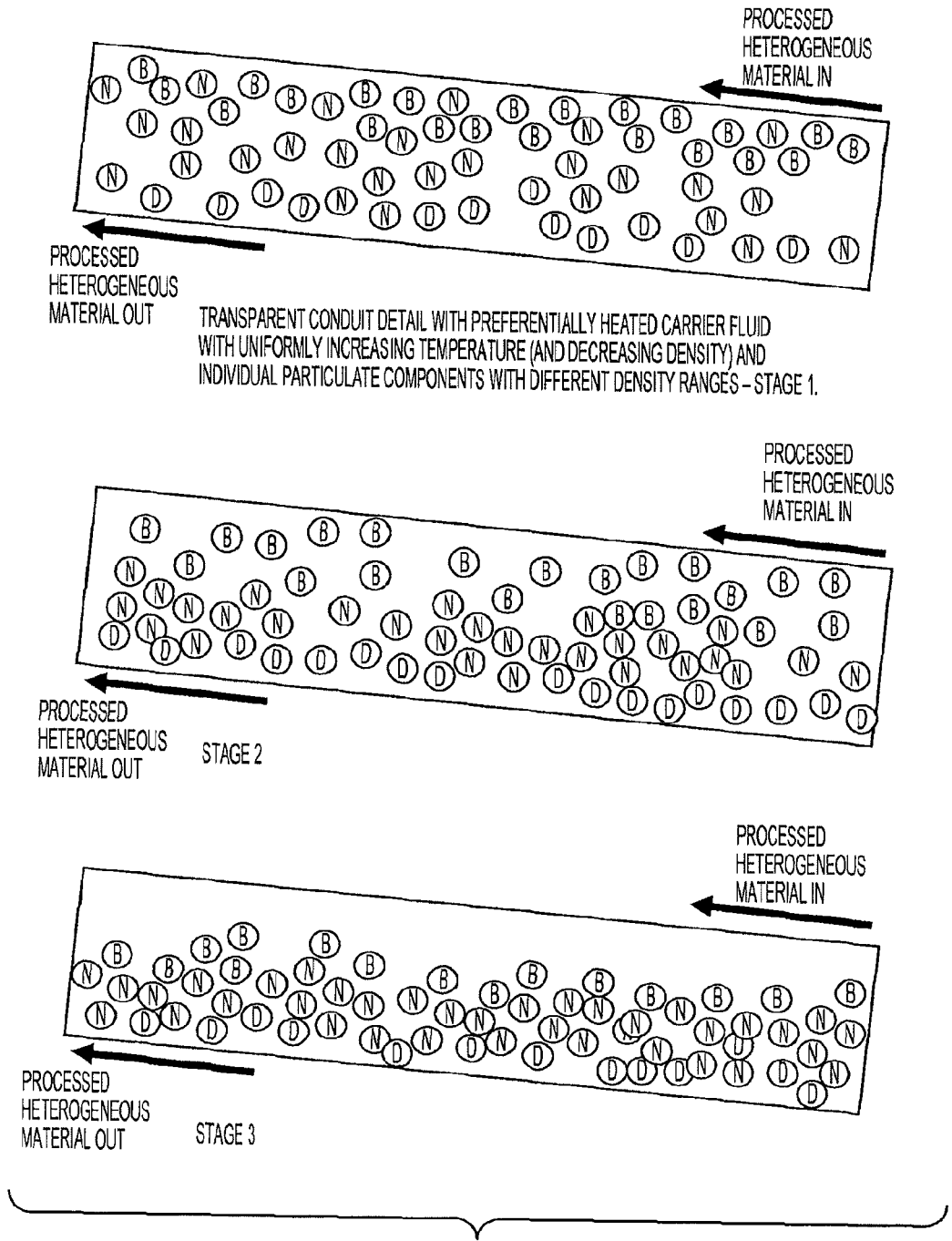
FIG. 6 illustrates a solid particle flow distribution at various stages according to some embodiments of the present invention.

FIG. 6—Stage 1 through Stage 3. Stage 1 depicted by FIG. 6 is the early stage of heating—with buoyant particles flowing along the top of the tube, neutral particles occupying random locations along the cross section of the tube and dense particles flowing along the bottom. Stage 2 of FIG. 6—is the second stage of heating where the temperature of the carrier fluid has been raised enough and its density has been reduced enough to cause settling out (flow along the bottom) of the initially neutral particles while the density of initially buoyant particles still remains below the density of the carrier fluid and therefore they continue to flow predominately along the top segment of the tube.

Finally Stage 3 depicted by FIG. 6 is a stage where the carrier fluid temperature has been raised high enough for its density to fall below the density of the initially buoyant particles, causing this product component (B) to also fall out of suspension and flow along the bottom of the tube. Within the population of initially dense (D), initially neutral (N) and initially buoyant (B) particles, the flow will become stratified—dense particles (D) will flow slower (and have longer residence times) than initially neutral particles (N) which will in turn flow slower than the initially buoyant particles (B), provided the rate of change of their density values with temperature is equal or similar.

When such stratified product flow is subjected to heating, and especially volumetric heating using electromagnetic energy under continuous flow conditions, this can result in wide differences in residence times within the heating segments of the process (i.e. energy exposure chamber), resulting in significantly different extents of time and temperature exposure for different solid components. With the fastest moving component the risk is to have it under-processed due to insufficient residence time spent within the energy exposure segments of the process—and have a potential health hazard to the consumer. With the slowest moving component the risk is to over-heat and therefore over-process that component resulting in excessive quality reduction and loss caused by thermal over-treatment.

Figure 7B:
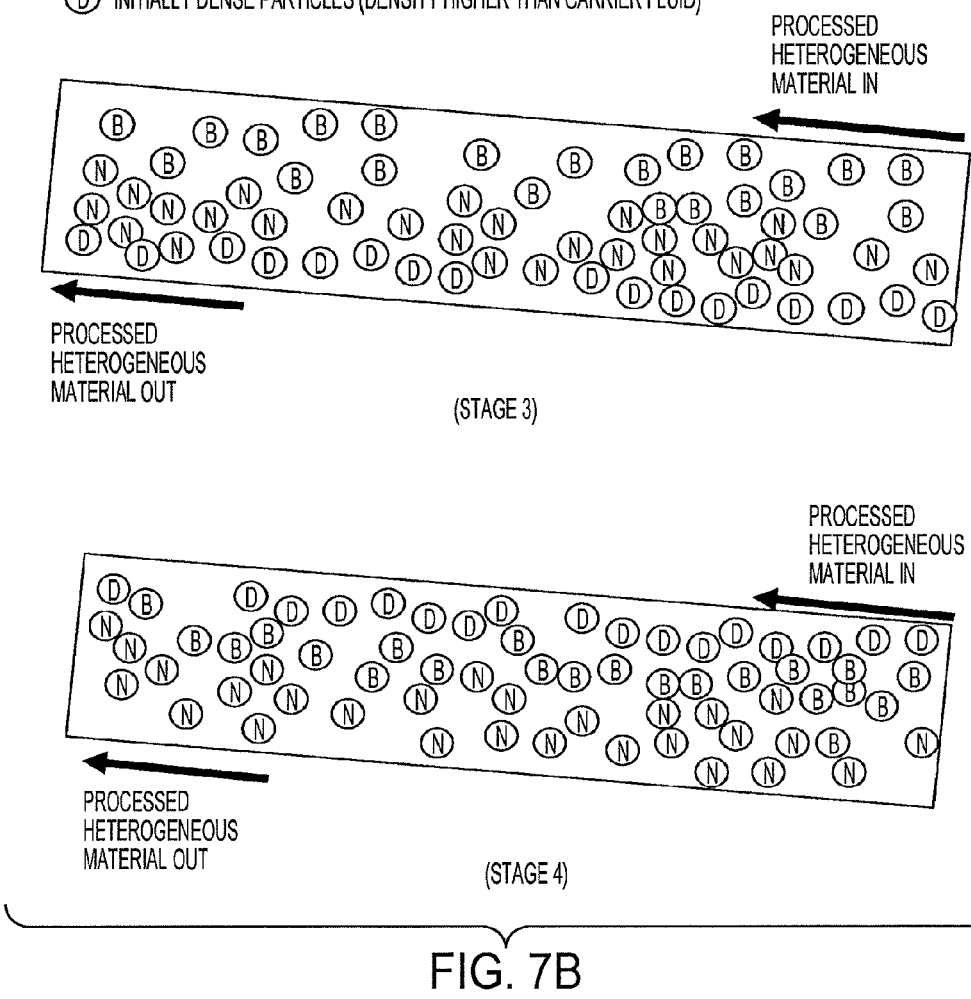
FIG. 7B illustrates a solid particle flow distribution at various stages after FIG. 7A according to some embodiments of the present invention.

FIG. 7 depicts stages 1 through 8 of heating of heterogeneous and multiphase materials during flow through a substantially horizontal microwave-transparent conduit under exposure to electromagnetic energy, with increased energy exposure and increased heating rates in the bottom segments of the conduit.

Embodiments of the present invention provides a means to address the problem of density-base settling out of solid particulate food or biomaterial components in thermal processing of heterogeneous foods and biomaterials using electromagnetic energy heating under continuous flow conditions by application of electromagnetic energy. The key element of the invention is maintaining the preferential heating of process material along the bottom segment of the flow-through, microwave transparent conduit. This can be achieved by ensuring the electromagnetic energy field remains stronger in the bottom segment of the flow-through tube throughout its exposure to the field. This arrangement enables a self-regulating process of dynamic density changes for carrier fluid and solid components carried within it throughout the heating stages. This process of density change is elaborated in detail in FIG. 7—Stage 1 through FIG. 7—Stage 9.

Stage 1 of FIG. 7 shows the initial stage of heating—dense particles (D) flowing along the bottom, neutral particles (N) throughout the tube and buoyant particles (B) along the top of the tube. Process material enters the energy exposure chamber and preferential heating of the bottom segment of the flow is initiated, causing the reduction of carrier fluid density along the tube bottom.

Stage 2 of FIG. 7—Carrier fluid temperature has been raised sufficiently and its density reduced sufficiently to fall below the density of the neutral particles (N), causing them to settle to the bottom segment of the tube during flow.

Stage 3 of FIG. 7—Due to exposure to higher temperatures of the carrier fluid and higher energy field, initially dense (D) particle components are heated and their density reduced until it falls below the density of the carrier fluid and preferably below density of other solid/particulate components of the product.

Stage 4 of FIG. 7—Due to its reduction in density caused by heating, initially dense (D) particle population moves upward through the carrier fluid and other solid components to be lifted to the top, colder regions of the tube, and pushes the initially neutral (N) and initially buoyant (B) particle populations toward the center and bottom of the tube respectively. This causes mixing between the particles and carrier fluid and contributes to equalization of both residence time and thermal exposure of all product components.

Stage 5 of FIG. 7—Initially neutral particles (N) flowing along the bottom segment of the tube get preferentially heated, reducing their density and causing their move back through the middle and to the top of the flow profile—as depicted by Stage 6 of FIG. 7.

Stage 6 of FIG. 7-Density of initially neutral particles, due to distribution of energy and temperature increase has been reduced sufficiently to cause their movement towards to top of the flow region.

Stage 7 of FIG. 7—Initially neutral particles (N) move to the top while the initially dense segment starts losing some of the heat to the carrier fluid surrounding it in the top, colder, less heated region of the tube—resulting in the relative increase of their density compared to the carrier fluid component. Meanwhile, initially buoyant particle population segment flowing along the tube bottom is heated by carrier fluid and surrounding electromagnetic energy field and its density is decreased.

Stage 8 of FIG. 7—Initially buoyant (B) solid component after heating at the bottom resulting in reduced density starts moving upward carried by the difference in density between it and the carrier fluid, while the initially dense (D) population starts falling out of the suspension towards the bottom of the flow due to higher density compared to the carrier fluid.

Finally the process starts over again with Stage 1 of FIG. 7 where new materials are introduced into the tube and density—based spatial flow distribution is reconstituted—with the initial flow distribution of buoyant particles (B) flowing mostly along the top, neutral particles (N) flowing throughout the tube and dense particles (D) flowing along the bottom of the tube is reestablished. Both horizontal (caused by pumping) and vertical (top to bottom and bottom to top) flow during thermal exposure serve to equalize residence times and thermal exposure of all components contained within the product. Stage 1 of FIG. 7 also re-establishes conditions for the described process to be restarted and reiterated at a higher temperature level. In this manner, preferential heating along the tube bottom serves to not only equalize the treatment throughout the product but causes movement of all particles which in a heterogeneous product serve as miniature mixing devices assisting with this equalization.

The thermal food processing process utilizes electromagnetic energy as the primary source of process material heating while maintaining continuous flow of process material from the initiation of the process until process termination requires innovative design components. The efficiency of this innovative thermal processing system causes the process material being pumped through the system to heat so rapidly that the total length has been significantly shortened. This shortening of the system length causes a reduction in natural back pressures inherently present within conventional thermal processes. The loss of this internal process pressure due to shortened length coupled with the process material being heated above 100 C (boiling at standard atmospheric pressure) creates a situation where process material may "flash" or boil within the system piping. The superheated temperatures are required to achieve the process goals, thus higher pressures within the superheated zones are required to prevent flashing of the liquid phase to vapor. Innovative design considerations must be utilized to establish a stable, controllable and predictable system.

Figure 8:
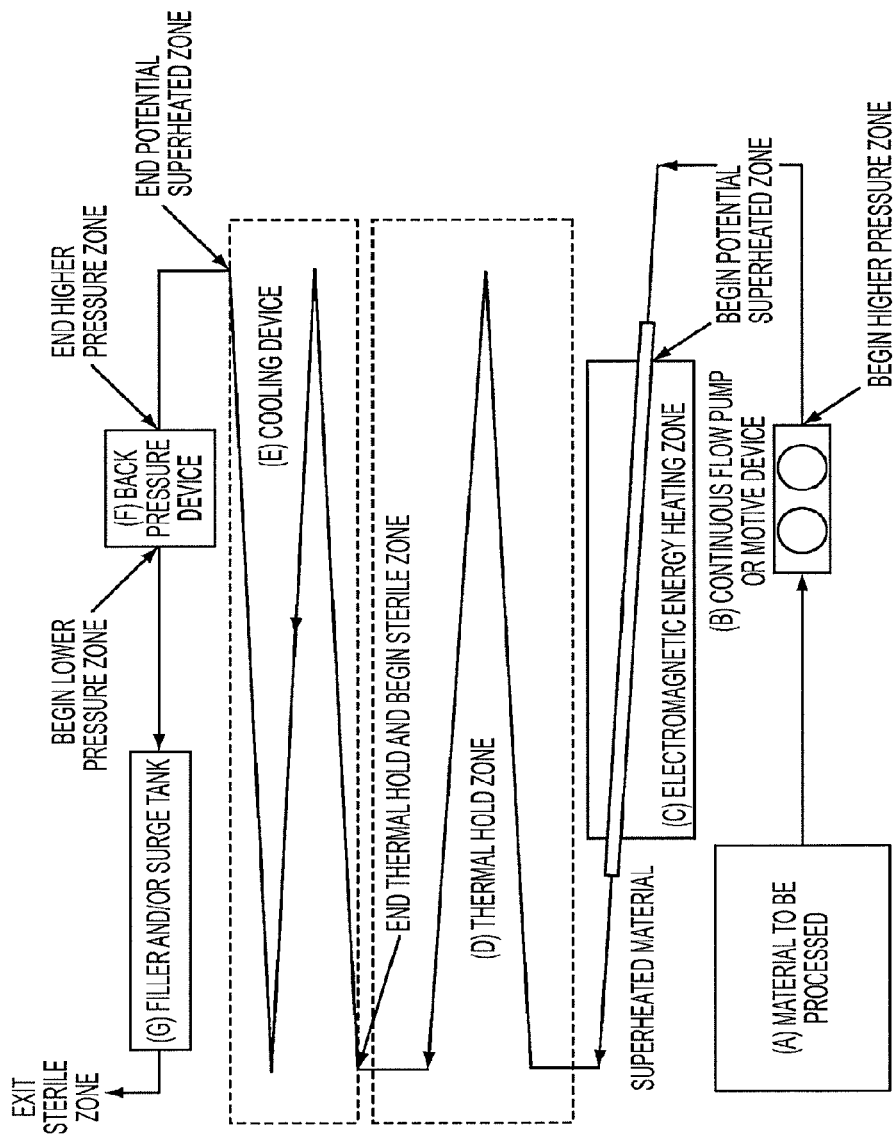
FIG. 8 illustrates a block diagram of a method for processing of heterogeneous materials according to some embodiments of the present invention.

FIG. 8 illustrates the general flow of the system with components and functions described as:

A. Material to be Processed. Material is pumpable or capable of moving through the system components in a controllable, consistent manner. Material to be processed may be homogeneous or heterogeneous, liquid, semi-solid or solid and may contain or be absent of discrete particles. Material may be in a completely natural, raw or non-processed state or may be processed or pre-treated to any degree.

B. Continuous Flow Pump or Motive Device. Material to be processed receives applied forces to establish continuous flow at a relatively constant rate throughout the entire system until termination of system flow requirements. Flow may be sufficiently consistent to maintain control within the operational parameters of the system as defined by the application. Flow may be established through the use of positive displacement pumps or pressurized systems with metered flow control. Multiple motive devices may be placed in series at determined intervals between the beginning and termination of flow to provide for staged or designed pressurization within the material conveyance system. The positive pumping characteristics or pressure-based force establishes an operational condition where downstream resistance to flow, whether artificial or natural to the system design, increases the process material pressure within the hermetic piping system. This internal pressure is highest at the discharge of the pump or pressure-based device and decreases as material flows toward the termination of the system.

C. Electromagnetic Energy Heating Zone. Material to be processed enters the Electromagnetic Energy Heating Zone where energy is applied and absorbed by the process material. Energy is converted to heat within the material creating the potential for superheated zones where temperature with insufficient pressure will result in "flashing" or the sudden conversion of liquid (i.e. water) to vapor (i.e. steam). These vapor "pockets" result in a loss of system control and predictability including, 1) increased volume of material thus reducing designed residence time within system components, 2) deposition of residue onto system surfaces, 3) physical changes or damage to process material, 4) undesirable cooling of process material, 5) loss of function of system components (i.e.—pumps or back pressure devices). Process material shall be at a predetermined temperature upon exiting the heating zone.

D. Thermal Hold Zone. The Thermal Hold Zone is a designed component of the process system, typically tubular, with a predetermined length and volume that yields a specific residence time for every particle of the process material at a given flow rate. The hold zone cannot be designed to contribute additional heating to the process material thus the temperature at the end of the hold zone shall be the same or lower than the temperature at the beginning of the hold zone. Temperatures within the hold zone may be of a superheated nature and thus, require sufficient pressure to remain in a non-vapor state as referenced in (C) above. The designed residence time and "end of hold" temperature serve as the legal thermal process of the system.

E. Cooling Device. Once the process material exits the Thermal Hold Zone, the desired thermal process has been delivered and it is typically desirable to cool the process material quickly. The process material enters the cooling device but is still in a superheated state thus, continues to require sufficient pressure to remain in a non-vapor state. Multiple design and device components may be integrated within the cooling device to satisfy the system pressure requirements. Process materials may be formulated to change rheological properties such as thickening upon cooling thus providing resistance to flow and increasing up-stream system pressure. Flow restrictors may be designed in the cooling zone or non-cooling conveyance piping to provide friction drag for up-stream pressure creation. These devices may strictly be designed for resistance to flow or may be multifunctional such as creating turbulence within the cooling device for increased cooling efficiency.

F. Back Pressure Device. Upon exiting the cooling device, the process material is no longer superheated to the level of requiring sufficient pressure to prevent "flashing;" however, a minimal pressure differential above the pressures external to the system is required in commercially aseptic processing. This nominal positive pressure differential is necessary to ensure that conditions for egress of internal process material exist and not ingress of external contamination into the system. Multiple types of Back Pressure Devices may be mounted after the exit of the cooling device to ensure all superheated areas within the cooling device are protected. These devices have a common characteristic of possessing a restrictive component to process material flow that is adjustable through spring tension, air pressure, hydraulic pressure, positioning device or other resistive force application. Once the process material passes the back pressure device, the resulting pressure is controlled by the filler system, receiving surge tanks or a system exit valve, marking the end of the continuous process.

G. Filler and/or Surge Tanks. The final components of the continuous process system will be a filler(s), storage or surge tank(s) or a combination of the two functions. The termination of the continuous process system may be fillers only with any material not filled exiting the system though a final device that acts as the back pressure device for the lower (filling) pressure zone. Surge tanks may be located before the filler systems or after the fillers as the termination point at the end of continuous flow. One single surge tank shall be maintained at the lower (filling) pressure allowing product to freely flow from the process system supply or to the filling systems. However, multiple surge tank systems can be utilized as controlling devices for both high and low pressure zones by isolating one tank and pressurizing to the higher level and acting as a receiver tank. At a predetermined point, another tank may act as the receiver tank and the initial tank pressure is lowered to filling pressure and dedicated to filling only.

Figure 11:
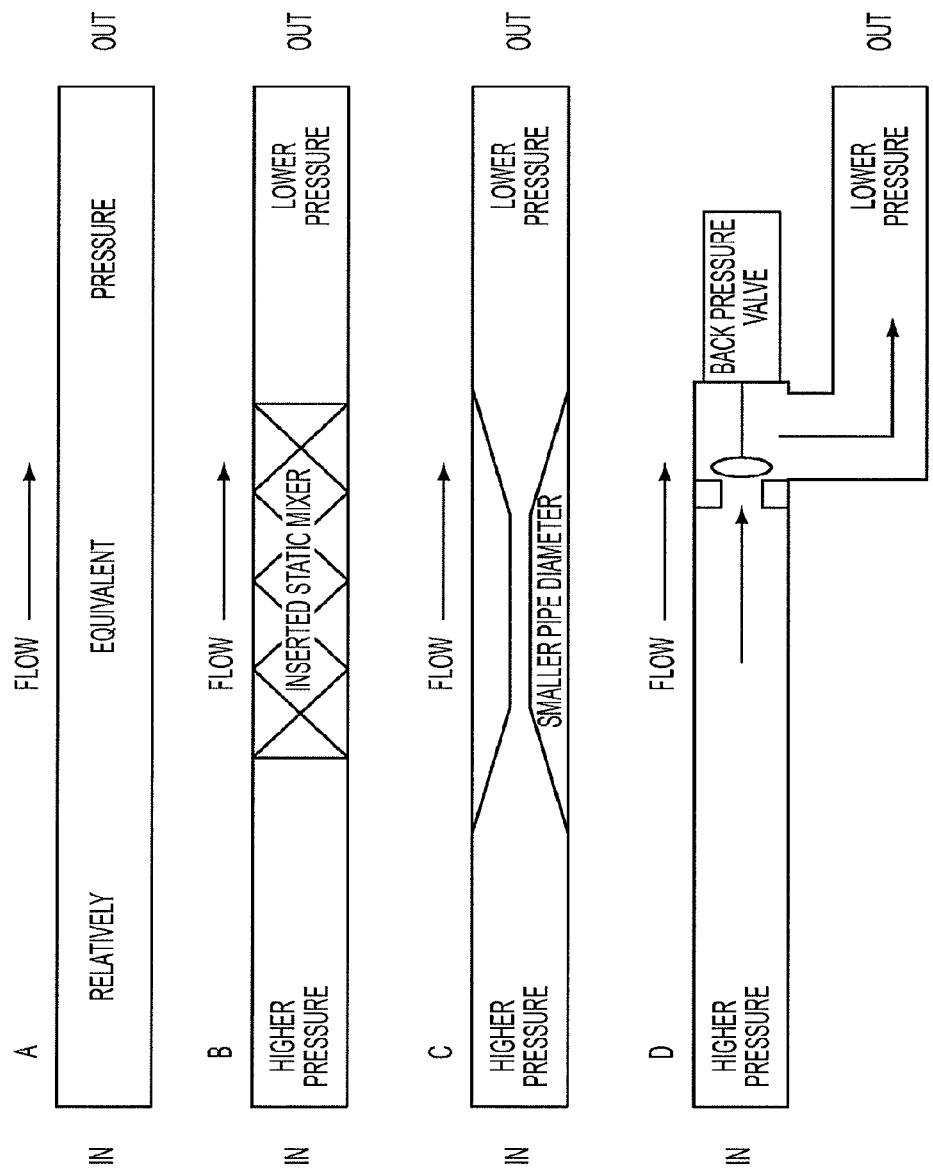
FIG. 11 illustrates a system for processing of heterogeneous materials according to another embodiment of the present invention.
Figure 12:
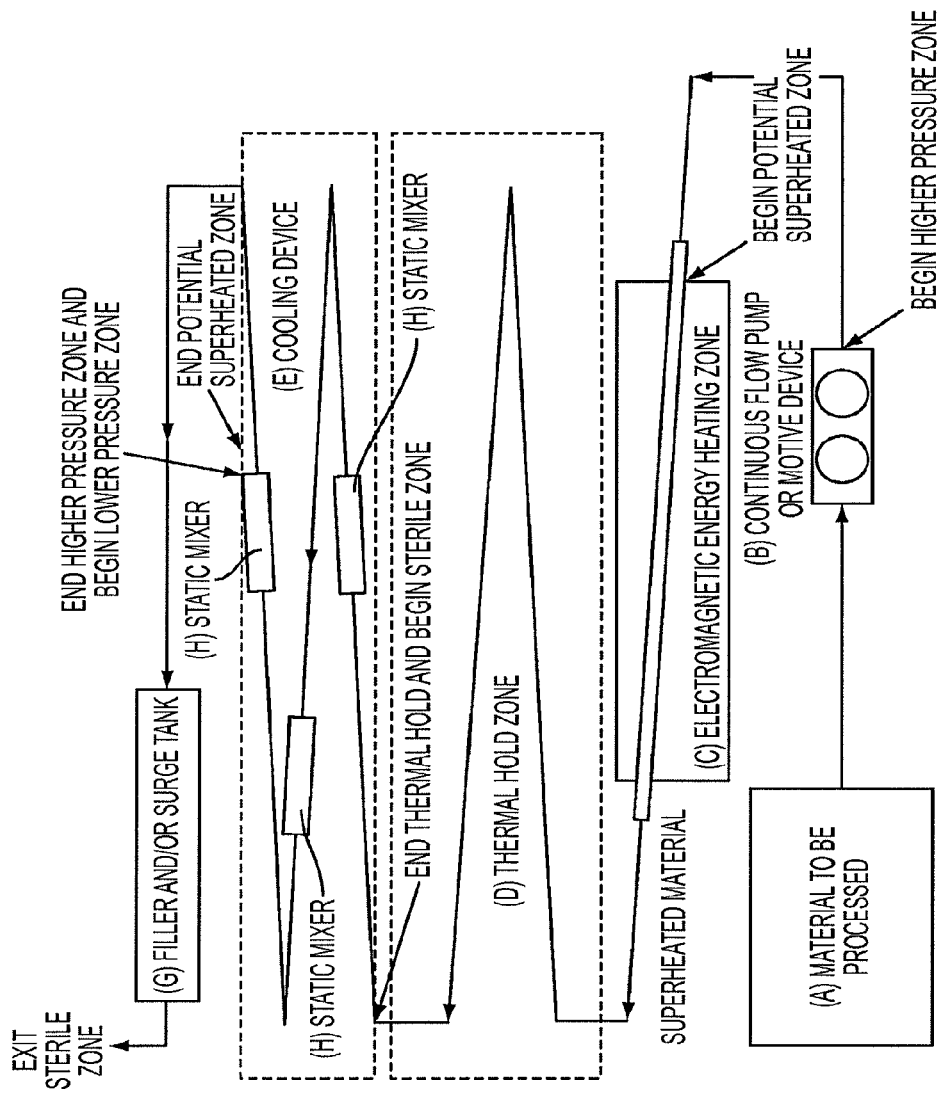
FIG. 12 a system for processing of heterogeneous materials according to another embodiment of the present invention.

FIG. 12 depicts one embodiment of the utilization of an existing apparatus, where a static mixer is placed within the described continuous flow electromagnetic thermal processing system (FIG. 11B) to attain desired back pressure within the process. Examples of static mixers are illustrated in FIGS. 9 and 10. An increase in frictional pressure caused by the use of a static mixer within a flowing system should be minimized. The utilization of static mixers are often reduced or avoided completely due to the addition frictional drag to the system. However, the unique characteristic of the electromagnetic thermal process system where the length has been dramatically shortened due to more efficient heating creates an absence of natural system pressurization as compared to conventional thermal systems. This loss of pressurization when coupled with superheated zones of process material allows vaporization of liquids to gasses, thus rendering the process uncontrollable. The addition of static mixers creates significant and quantifiable pressure increases upstream of their location. These devices may provide secondary process improvements through the creation of forced turbulence within the fluid flow on the continuous system or the devices may only benefit the process through added back pressure. It should be noted that "back pressure" refers to applying a force to the materials in a direction that is opposite of the flow of the material. The insertion of one or more static mixers after the end of the Thermal Hold (ref. FIG. 12) and within the cooling device or any point before the filler and/or surge tank portion of the process will provide additional back pressure within the system to maintain control of the fluid phase material in the superheated zones. A conscious design must be applied to quantify the pressure increase considering flow rate, process material physical characteristics, temperature, device type and length, process equipment dimensions and location.

The utilization within the cooling device provides secondary benefits of induced turbulence resulting in a reduced boundary layer at the cooling surface, thus improving the efficiency of cooling. Use of the static mixers allows for larger clearances within the cooling device, thus creating conditions that are induce less shear and mechanical stresses to the process material.

Figure 13:
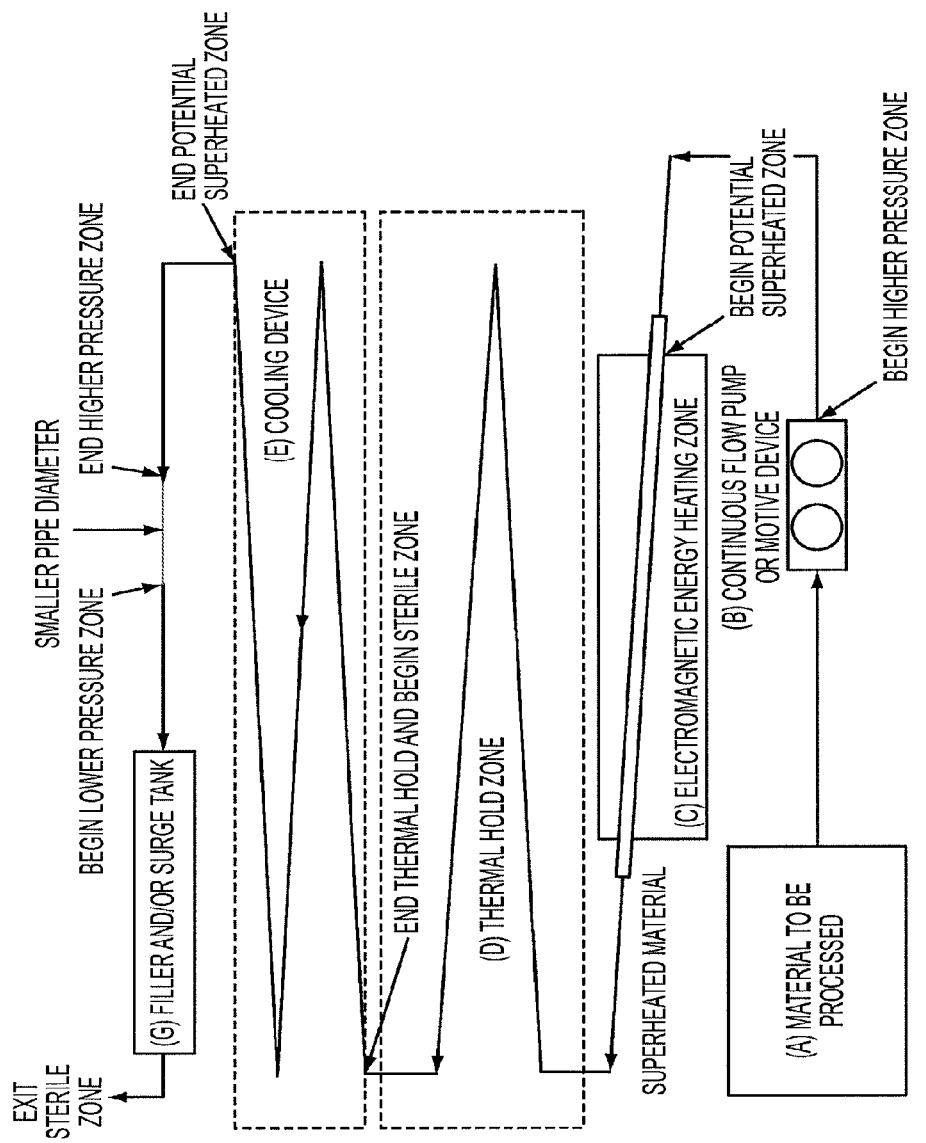
FIG. 13 a system for processing of heterogeneous materials according to yet another embodiment of the present invention.

FIG. 13 depicts the utilization of smaller diameter piping within the described continuous flow electromagnetic thermal processing system (FIG. 11C) to attain desired back pressure within the process. The smaller piping creates more friction drag thus resulting in an increased back pressure within the system. The device may be placed after the cooling zone or may be designed to be within the cooling zone.

FIG. 11 depicts the utilization of an existing apparatus, a Back Pressure Valve, within the described continuous flow electromagnetic thermal processing system to attain desired back pressure within the process. The Back Pressure Valve should be located after the cooling device due to its nature of design.

Embodiments of the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system comprising:
   a conduit configured to carry heterogeneous materials that is pumped therethrough;
   a first applicator comprising an end portion, a waveguide, a material entry port, and a material exit port, wherein a terminating member is connected to the first applicator, and wherein the heterogeneous materials are pumped along a longitudinal length of the waveguide into the material entry port of the end portion of the first applicator and out the material exit port while electromagnetic energy is delivered to the first applicator;
   an electromagnetic generator connected to the first applicator so as to provide the electromagnetic energy to the first applicator while the heterogeneous materials are being conveyed horizontally along a longitudinal axis of the waveguide;

a second applicator comprising a beginning portion, an end portion, and a second waveguide, wherein electromagnetic energy is conveyed from the beginning portion through the second waveguide to the end portion;

wherein the first applicator further comprises an electromagnetic energy entry port and an electromagnetic energy exit port, wherein the second applicator further comprises an electromagnetic energy entry port and an electromagnetic energy exit port, wherein the first applicator material entry port is located proximate to the first applicator electromagnetic energy entry port, wherein the first applicator material exit port is located proximate to the first applicator electromagnetic energy exit port, wherein the second applicator material entry port is located proximate to the second applicator electromagnetic energy entry port, and wherein the second applicator material exit port is located proximate to the second applicator electromagnetic energy exit port.

2. The system of claim 1, wherein at least one percent (1%) of the heterogeneous materials comprises solid materials.

3. The system of claim 1, wherein the heterogeneous materials comprise at least one of fruits, vegetables or a material originating from an animal.

4. The system of claim 1, wherein the electromagnetic generator is the only generator supplying electromagnetic energy to the first and second applicators.

5. The system of claim 1, wherein a first termination member is attached to the end portion of the first applicator so that no electromagnetic energy transfers from the first applicator to the second applicator, and wherein a second termination member is attached to the end portion of the second applicator so that electromagnetic energy does not proceed past the second termination member.

6. The system of claim 5, wherein a first termination member is attached to the end portion of the first applicator so that no electromagnetic energy transfers from the first applicator to the second applicator, and wherein a second termination member is attached to the end portion of the second applicator so that electromagnetic energy does not proceed past the second termination member.

7. The system of claim 5, wherein the heterogeneous materials comprises a carrier fluid, dense particles having a density higher than the carrier fluid, neutral particles having a density proximate to the carrier fluid, and buoyant particles having a density lower than the carrier fluid, wherein the dense particles are heated faster in the conduit by the electromagnetic energy than the neutral or buoyant particles because the dense particles initially are more concentrated in the bottom portion of the conduit's interior.

8. The system of claim 1, wherein the conduit comprises an interior and is attached to the first applicator; and wherein the conduit interior comprises a top portion, a bottom portion and a center portion, wherein the conduit is aligned along the longitudinal length of the first applicator so that a higher concentration of the electromagnetic energy is applied to the bottom portion relative to the center and top portions of the conduit's interior thereby causing materials in the bottom portion of the conduit's interior to heat faster than materials in the center and top portions of the conduit's interior.

9. The system of claim 8, wherein the conduit is positioned along a plane that is substantially perpendicular to the force of gravity.

10. The system of claim 8, wherein the conduit is positioned along a plane that is at an angle of at least one degree relative to the ground so that the first applicator material entry port is lower than the first applicator material exit port, thereby forcing the material to be pumped against the force of gravity.

11. A system comprising:

a conduit configured to carry heterogeneous materials that is pumped therethrough;

a first applicator comprising an end portion, a waveguide, a material entry port, and a material exit port, wherein a terminating member is connected to the first applicator, and wherein the heterogeneous materials are pumped along a longitudinal length of the waveguide into the material entry port of the end portion of the first applicator and out the material exit port while electromagnetic energy is delivered to the first applicator;

an electromagnetic generator connected to the first applicator so as to provide the electromagnetic energy to the first applicator while the heterogeneous materials are being conveyed horizontally along a longitudinal axis of the waveguide;

a second applicator comprising a beginning portion, an end portion, and a second waveguide, wherein electromagnetic energy is conveyed from the beginning portion through the second waveguide to the end portion;

wherein the first applicator further comprises an electromagnetic energy entry port and an electromagnetic energy exit port, wherein the second applicator further comprises an electromagnetic energy entry port and an electromagnetic energy exit port, wherein the first applicator material entry port is located proximate to the first applicator electromagnetic energy entry port, wherein the first applicator material exit port is located proximate to the first applicator electromagnetic energy exit port, wherein the second applicator material entry port is located proximate to the second applicator electromagnetic energy entry port, wherein the second applicator material exit port is located proximate to the second applicator electromagnetic energy exit port, wherein the electromagnetic generator is the only generator supplying electromagnetic energy to the first and second applicators, wherein a first termination member is attached to the end portion of the first applicator so that no electromagnetic energy transfers from the first applicator to the second applicator, and wherein a second termination member is attached to the end portion of the second applicator so that electromagnetic energy does not proceed past the second termination member, wherein the conduit comprises an interior and is attached to the first applicator, and wherein the conduit interior comprises a top portion, a bottom portion and a center portion, wherein the conduit is aligned along the longitudinal length of the first applicator so that a higher concentration of the electromagnetic energy is applied to the bottom portion relative to the center and top portions of the conduit's interior thereby causing materials in the bottom portion of the conduit's interior to heat faster than materials in the center and top portions of the conduit's interior.

12. The system of claim 11, wherein the heterogeneous materials comprises a carrier fluid, dense particles having a density higher than the carrier fluid, neutral particles having a density proximate to the carrier fluid, and buoyant particles having a density lower than the carrier fluid, wherein the dense particles are heated faster in the conduit by the electromagnetic energy than the neutral or buoyant particles because the dense particles initially are more concentrated in the bottom portion of the conduit's interior.

13. The system of claim 11, wherein the conduit is positioned along a plane that is substantially perpendicular to the force of gravity.

14. The system of claim 11, wherein the conduit is positioned along a plane that is at an angle of at least one degree relative to the ground so that the first applicator material entry port is lower than the first applicator material exit port, thereby forcing the material to be pumped against the force of gravity.

15. The system of claim 11, wherein the conduit is positioned along a plane that is at an angle of at least one degree relative to the ground so that the first applicator material entry port is lower than the first applicator material exit port, thereby forcing the material to be pumped against the force of gravity.

* * * * *